US012137310B2

(12) United States Patent
Girton et al.

(10) Patent No.: US 12,137,310 B2
(45) Date of Patent: Nov. 5, 2024

(54) VOICE COMMUNICATION RELAY SYSTEM FOR USE WITH PROTECTIVE GEAR

(71) Applicant: Government of the United States, as represented by the Secretary of the Air Force, Wright-Patterson AFB, OH (US)

(72) Inventors: Damon Girton, Terre Haute, IN (US); Johnathan McAllister, Washington, DC (US); Matthew Scharf, Fairborn, OH (US); Matthew Seymour, Springboro, OH (US); Peter Voland, Beavercreek, OH (US); Matthew Stechschulte, Waynesville, OH (US); Nathan Stover, Xenia, OH (US); Stevan Gallegos, Oakwood, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 247 days.

(21) Appl. No.: 17/854,002

(22) Filed: Jun. 30, 2022

(65) Prior Publication Data

US 2023/0035253 A1    Feb. 2, 2023

Related U.S. Application Data

(60) Provisional application No. 63/227,960, filed on Jul. 30, 2021.

(51) Int. Cl.
*H04R 1/08* (2006.01)
*A62B 18/08* (2006.01)
(Continued)

(52) U.S. Cl.
CPC ............. *H04R 1/083* (2013.01); *A62B 18/08* (2013.01); *H04B 1/385* (2013.01); *H04R 1/1041* (2013.01)

(58) Field of Classification Search
CPC .. H04R 1/083; H04R 1/1041; H04R 2420/07; A62B 18/08; H04B 1/385;
(Continued)

(56) References Cited

U.S. PATENT DOCUMENTS 3,140,754 A    7/1964 Motsinger
3,180,333 A    4/1965 Lewis
(Continued)

FOREIGN PATENT DOCUMENTS

EP    1477208 A1    11/2004
WO    9509676 A1    4/1995
WO    02060537 A1    8/2002

OTHER PUBLICATIONS

Silynx, Hazmat Chest PTT Cable product, published on the internet at https://www.silynxcom.com/product/hazmat-chest-ptt-cable/, publication date unknown, but before the filing date of the provisional application.
(Continued)

*Primary Examiner* — Daniel C Puentes
*Assistant Examiner* — Joseph James Peter Illicete
(74) *Attorney, Agent, or Firm* — AFMCLO/JAZ; Jeffrey V. Bamber (57) ABSTRACT

A voice communication relay device for use in combination with a protective face mask having an embedded microphone, a headset, a radio, and a push-to-talk (PTT) device that is connected to a radio. The voice communication relay device includes: a housing; a device speaker associated with the housing; an amplifier in the housing, the amplifier being electrically connected to the device speaker; a circuit board
(Continued)

located inside of the housing; and a power source. At least one function of the circuit board is to serve as an Impedance dependent auto switch (IDAS) that is electrically connected to the device speaker and an output connector for selectively sending signals to the device speaker or to a radio that is connected to the PTT device.

10 Claims, 10 Drawing Sheets

(51) Int. Cl.
  *H04B 1/3827* (2015.01)
  *H04R 1/10* (2006.01)
(58) Field of Classification Search
  CPC . H04B 2001/3866; A61M 16/06; H04M 1/05;
        H04M 1/6066; H04M 1/6058; A42B
        3/30; B64D 2231/025; A41D 13/11;
        H01H 33/166; H01H 33/167; H01H
        33/168
  USPC .................................................. 128/201.19
  See application file for complete search history.

(56) References Cited

U.S. PATENT DOCUMENTS

| | | | |
|---|---|---|---|
| 4,736,740 A | | 4/1988 | Parker et al. |
| 4,756,308 A | | 7/1988 | Ryback |
| 4,885,796 A | | 12/1989 | Loftus et al. |
| 5,060,308 A | | 10/1991 | Bieback |
| 5,990,793 A | | 11/1999 | Bieback |
| 6,671,371 B1 | * | 12/2003 | McNeill ............. H04M 1/6033 379/390.03 |
| 7,234,462 B2 | | 6/2007 | Pallazzotto et al. |
| 8,606,572 B2 | * | 12/2013 | Zhu .................... G10L 21/0208 704/233 |
| 8,667,959 B2 | | 3/2014 | Tilley et al. |
| 9,047,873 B2 | * | 6/2015 | Schuck ................. G10L 21/02 |
| 9,402,119 B2 | | 7/2016 | Contreras-Hernandez et al. |
| 9,560,459 B2 | | 1/2017 | Wheatley et al. |
| 10,193,588 B2 | * | 1/2019 | Volmer ................ H04R 1/1008 |
| 10,857,399 B2 | | 12/2020 | Riccio |
| 2003/0224838 A1 | | 12/2003 | Skillicorn et al. |
| 2007/0049360 A1 | * | 3/2007 | Birli ........................ H04M 1/05 455/575.1 |
| 2007/0105601 A1 | * | 5/2007 | Ibbetson ............. H04M 1/6058 381/74 |
| 2009/0052714 A1 | * | 2/2009 | Wilbur .................. H04B 1/385 381/364 |
| 2017/0164091 A1 | * | 6/2017 | Schunack ............ H04R 1/1041 |

OTHER PUBLICATIONS

U.S. Department of Homeland Security, Snapshot: S&T's NUSTL Assesses In-Suit Communications Equipment, published on the internet at https://www.dhs.gov/science-and-technology/news/2019/10/03/snapshot-st-assesses-suit-communications-equipment, Oct. 3, 2019.
Cavcom Inc, Talk Through Your Ears(R) In-Suit Communication System, published on the internet at https://cavcominc.com/applications/in-suit-communication, publication date unknown, but before the filing date of the provisional application.
The Safety Equipment Store, MSA-10026265, Amplifier, Voice, ESP II, published on the internet at https://www.thesafetyequipmentstore.com/MSA-10026265.html, publication date unknown, but before the filing date of the provisional application.
Gentex Corporation, Gentex Joint Service Aircrew Mask (JSAM) Conversational Communications Unit (CCU), published on the internet at https://shop.gentexcorp.com/hearing-protection-communications/ccu/, publication date unknown, but before the filing date of the provisional application.
Surefire, LLC, Surefire Flashlights published on the internet at https://www.surefire.com/products/illumination/flashlights/edcl1-t/, publication date unknown, but before the filing date of the provisional application.
Minnesota Mining and Manufacturing Company, 3M™ Peltor™ Push-To-Talk, published on the Internet at https://www.3m.com/3M/en_us/p/d/v000350057/, publication date unknown, but before the filing date of the provisional application.

* cited by examiner

VOICE COMMUNICATION RELAY SYSTEM FOR USE WITH PROTECTIVE GEAR

Pursuant to 37 C.F.R. § 1.78(a)(4), this application claims the benefit of and priority to prior filed Provisional Application Ser. No. 63/227,960, filed Jul. 30, 2021, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to communication systems and, more particularly, to a voice communication relay system for use with protective gear.

BACKGROUND OF THE INVENTION

Military members are required to wear Mission Oriented Protective Posture (MOPP) equipment while deployed in an environment where attacks of a chemical, biological, radiological, or nuclear (CBRN) nature are likely. Wearing MOPP equipment results in visual, touch, voice, and hearing degradations to some extent. In such situations, military members may wear an M50 series protective mask such as that manufactured by Avon Protection Systems, Inc. along with their MOPP gear. The M50 mask is located over the face and is equipped with a speaker to allow for external communication.

Currently, the M50 mask is worn along with a headset such as a 3M PELTOR™ COMTAC™ headset having a boom microphone. The headset may be linked to the user's radio, such as through a push-to-talk (PTT) device. While wearing MOPP gear, PELTOR™ COMTAC™ headsets are worn outside the MOPP suit to avoid issues with splits in fabric of the MOPP suit and space requirements. The PELTOR™ COMTAC™ boom microphone is positioned in front of the external speaker of the M50 gas mask. The M50 speakers have been found to result in less than desirable human speech reproduction. There is a further decrease in communication quality due to the user having their voice broadcast from the M50 external speaker, into the PELTOR™ COMTAC™ boom microphone, and then to the intended person(s) by way of radio. The decrease in communication quality cannot be avoided due to the need to pass along information without removing the gas mask in a CBRN environment. This may result in critical information being missed and needing to be repeated, resulting in delays which may cost time, money, and lives.

A need, therefore, exists for improved communication systems that can be used while personnel are wearing protective equipment that has improved voice transmission quality. In particular, a need exists for such communication systems that provide improved voice transmission quality for both speaking to others in the person's vicinity using a speaker system, and for speaking to others over a radio.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a voice communication relay device (or a voice amplification device) is provided for use in combination with: a protective face mask having an embedded microphone, a headset with a connection for a boom microphone, a radio, and a push-to-talk (PTT) device that is connected to a radio.

The voice communication relay device may comprise: a housing; a device speaker associated with the housing; an amplifier in the housing, the amplifier being electrically connected to the device speaker; a microphone pre-amplifier; a circuit board located inside of the housing; and a power source. The circuit board is electrically connected to a first connector for establishing a connection with the audio output of a headset. The circuit board is also electrically connected to the device speaker; and to a second connector for establishing a connection between the voice communication relay device and a PTT device. When in use, the circuit board is electrically connected to: an input from a microphone in a wearer's protective face mask; the device speaker (output option 1); and a radio (output option 2). The power source may be electrically connected to the device speaker, and the circuit board. There may be a first receptacle in the housing for the first connector for establishing a connection between the audio output of a headset and the device speaker so that a user's voice will be transmitted to the device speaker of the voice communication relay device without using any speaker on the protective face mask. There may be a second receptacle in the housing for a second connector for establishing a connection between the voice communication relay device and a PTT device. The PTT device may in turn be connected to a user's radio for communication with other radios. At least one function of the circuit board is to serve as an Impedance Dependent Auto Switch (IDAS) that is electrically connected to the speaker and to the second connector for selectively sending signals to the device speaker or to a radio that is connected to the PTT device.

A voice amplification system (or voice communication relay system) may be provided that comprises a voice communication relay device such as that described above, and a connector having two ends, each end with two pins thereon, the ends comprising a first end and a second end. One of the ends of the connector is configured to be inserted into a two pin female port of a headset with a boom microphone, and the other end is configured to be inserted into a two pin female port of a gas mask.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to communication systems and, more particularly, to a voice communication relay device and system for use with protective gear.

Figure 1:
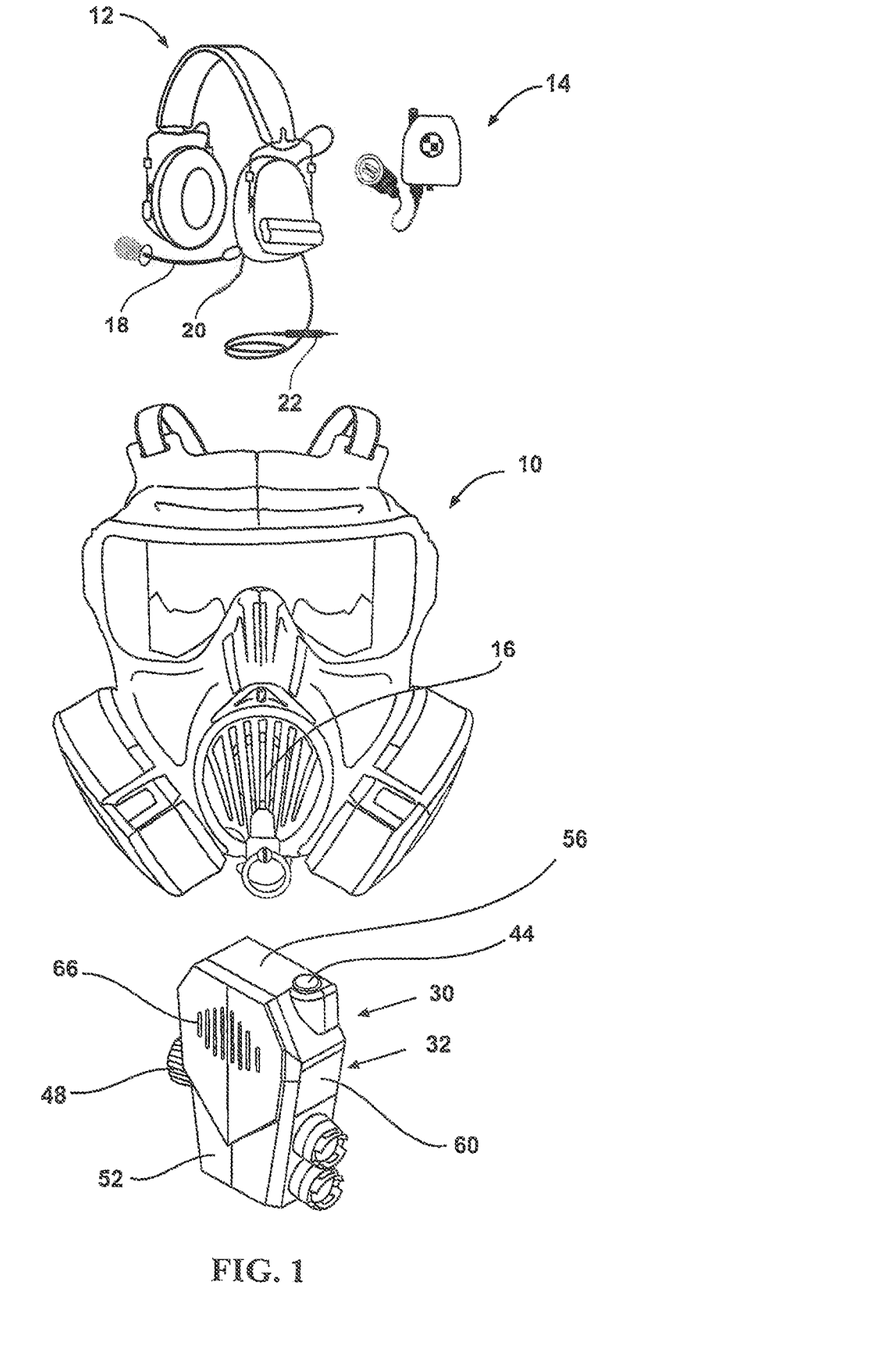
FIG. 1 is a perspective view of a gas mask, a headset with a boom microphone, a push-to-talk device, and the voice communication relay device.

The voice communication relay device (or voice amplification device) is used in combination with a user's existing protective and communication equipment. Such equipment may include: a protective face mask such as a gas mask having an embedded microphone and a speaker; a headset with a boom microphone; a radio; and a push-to-talk (PTT) device that is connected to a radio. FIG. 1 shows one embodiment of the user's protective and communication equipment which includes: a protective face mask 10 in the form of an M50 gas mask, a headset 12 in the form of a PELTOR™ COMTAC™ headset, and a PTT device 14, along with the voice communication relay device 30 of the present invention.

The protective face mask 10 can be any suitable type of protective face mask including, but not limited to gas masks (e.g., powered air purifying respirators (PAPR's)), self-contained breathing apparatuses (SCBA's) such as used by firefighters, and other masks provided with an internal microphone. It should be understood, however, that the voice communication relay system may be made specifically for a certain type of mask and might not be interchangeable between different types of masks (e.g., the one made for SCBA might not work with PAPR).

M50 series protective masks are manufactured by Avon Protection Systems, Inc. of Cadillac, MI. A patent that appears to be directed to such a mask is U.S. Pat. No. 8,667,959 B2, Tilley, et al. The M50 mask has an embedded electret microphone (conventional and not shown) and a speaker 16. The speaker 16 can be removed, or the mask can be obtained without the speaker to save costs. In either case, the protective mask 10 has a connection for a speaker. The connection for the mask speaker 16 may be in the form of a 2-pin female port 24 as shown in FIG. 2.

The headset 12 can be any suitable type of headset that provides ear pieces for receiving communications and a microphone for emitting verbal communications. Suitable headsets 12 include, but are not limited to the 3M™ PELTOR™ COMTAC™ headset sold by the Minnesota Mining and Manufacturing Company. The PELTOR™ COMTAC™ headset is supplied with a boom microphone having a 2-pin female port for connecting a boom microphone 18 to the headset. For the purposes of the present invention, the boom microphone 18 will be removed, and its 2-pin port will be used to establish a connection between the headset 12 and the embedded microphone in the gas mask 10. The PELTOR™ COMTAC™ headset is also provided with a cord having a single NEXUS® TP-120 (NATO) male plug 22 at the end of the cord. In the conventional practice, this plug 22 is typically used for plugging into the push-to-talk (PTT) device 14.

The push-to-talk (PTT) device 14 can be any suitable type of PTT device including, but not limited to the push-to-talk (PTT) device that is provided with the 3M™ PELTOR™ COMTAC™ III ACH Tactical Communication Headset Headband Kit.

Figure 2:
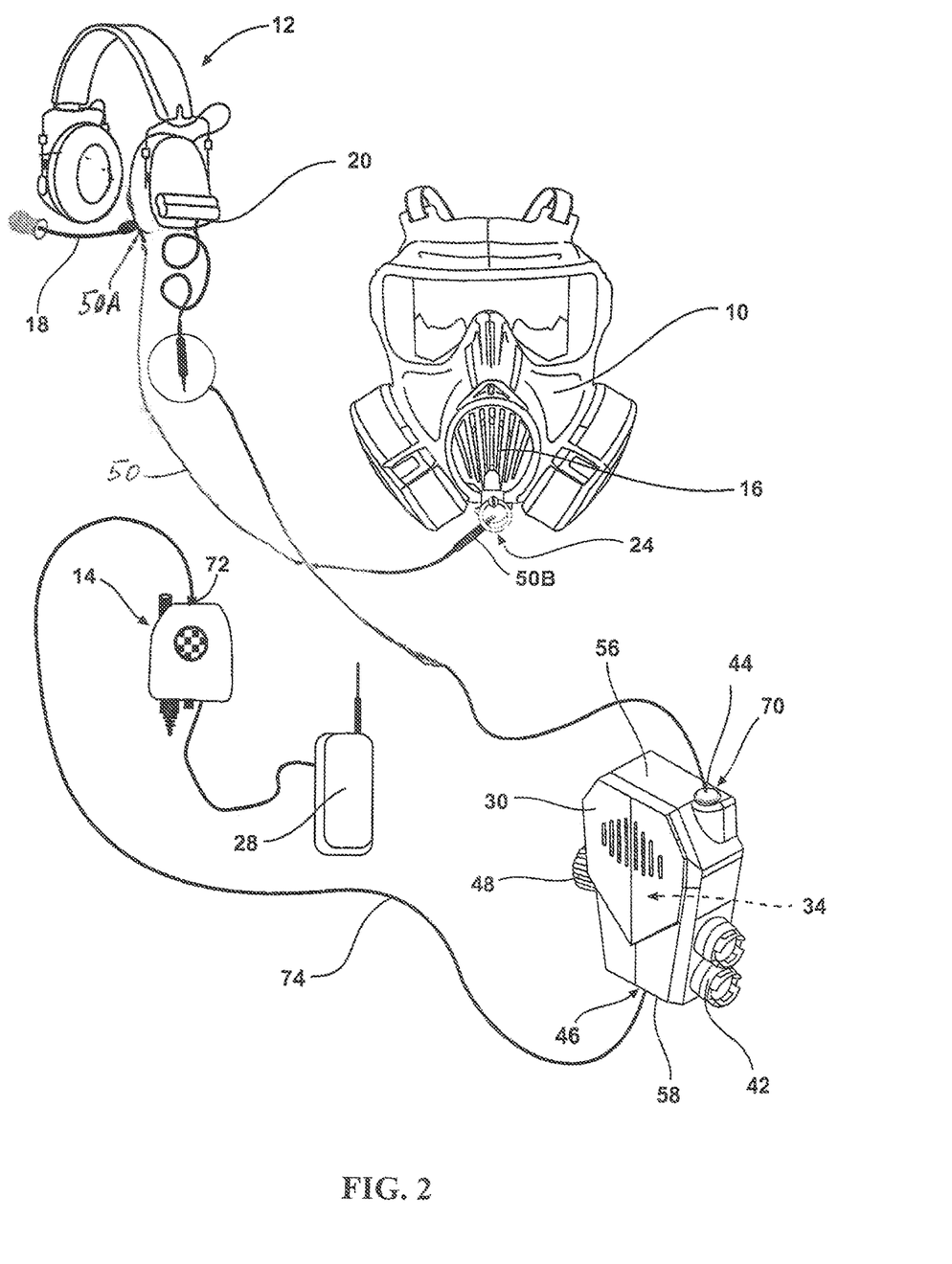
FIG. 2 is a schematic diagram showing the connections between the user's existing protective and communication equipment and the voice communication relay device.
Figure 3:
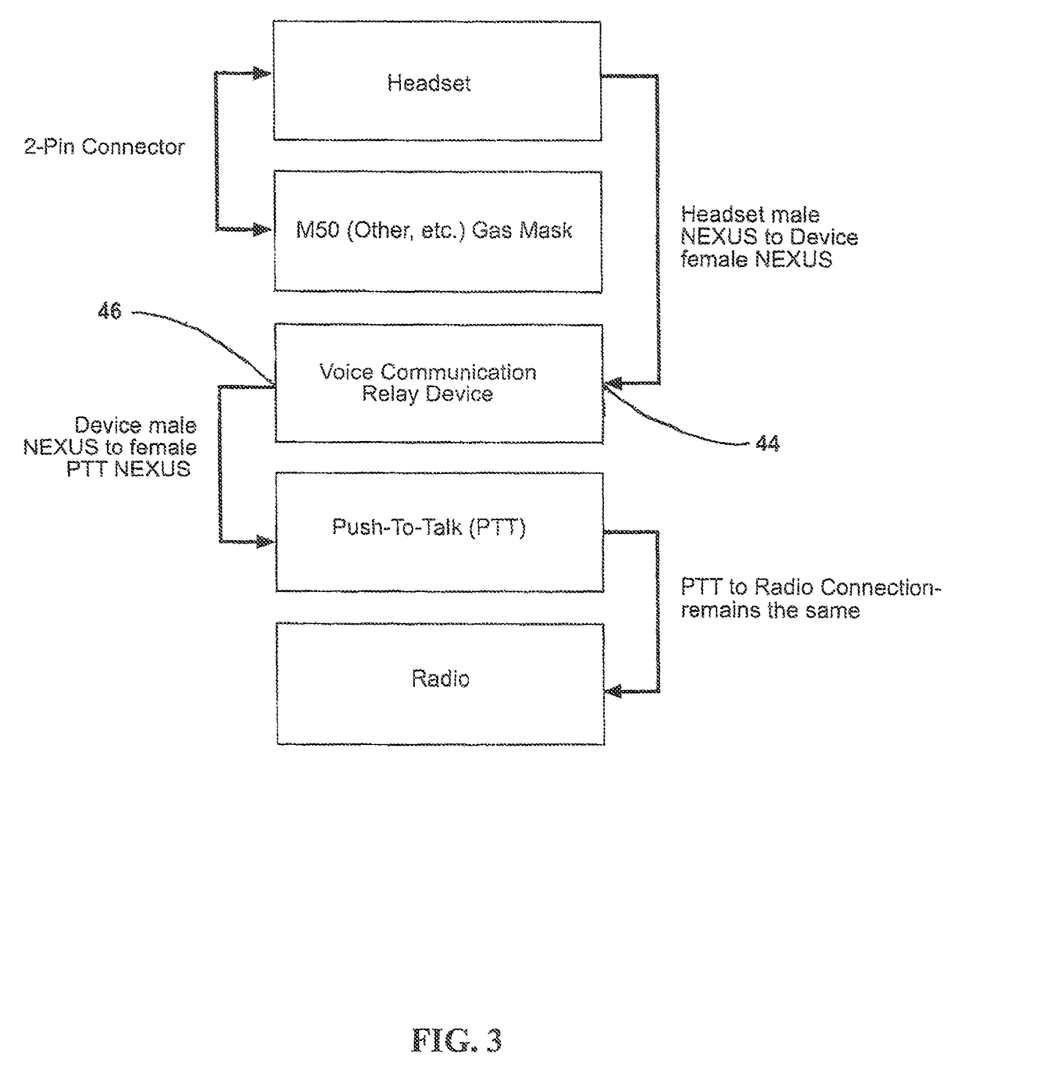
FIG. 3 is a block diagram of the connections shown in FIG. 2.
Figure 4:
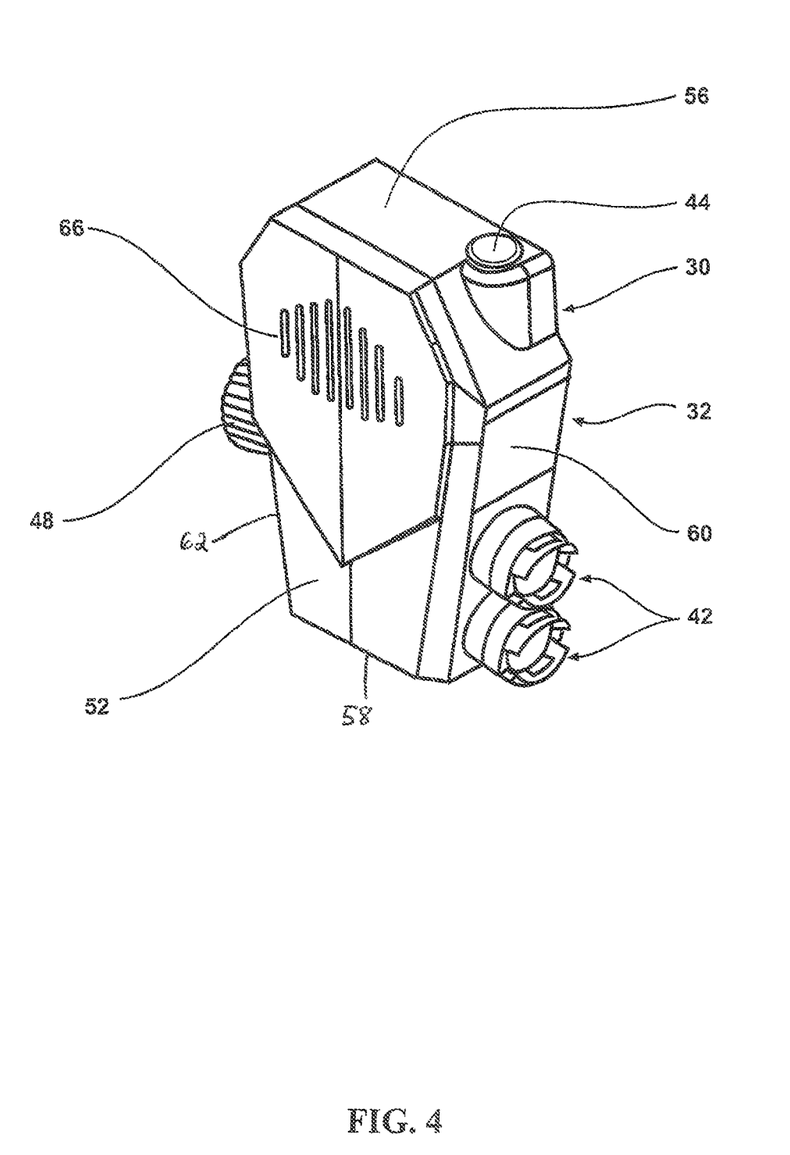
FIG. 4 is a perspective view of one embodiment of the voice communication relay device.
Figure 5:
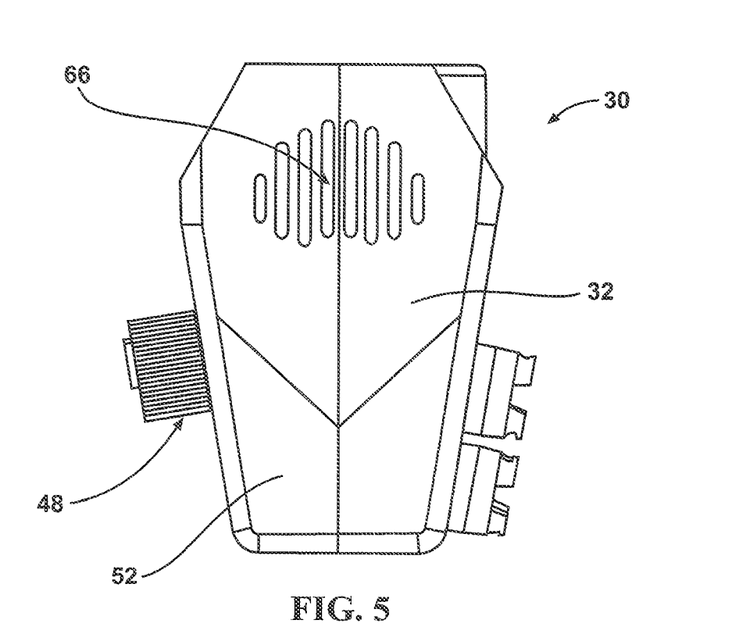
FIG. 5 is a front view of the voice communication relay device shown in FIG. 4.

FIG. 2 shows one non-limiting embodiment of the connections between the user's existing protective and communication equipment and the components of the voice communication relay device 30 of the present invention. The cord 74 running from the bottom of the voice communication relay device 30 will plug into the PTT device 14. In some cases, the bottom of the voice communication relay device 30 may sit on top of the PTT device 14. FIG. 2 shows that the PTT device 14 is connected to a user's radio 28. FIG. 3 is a block diagram of the connections shown in FIG. 2.

Figure 11:
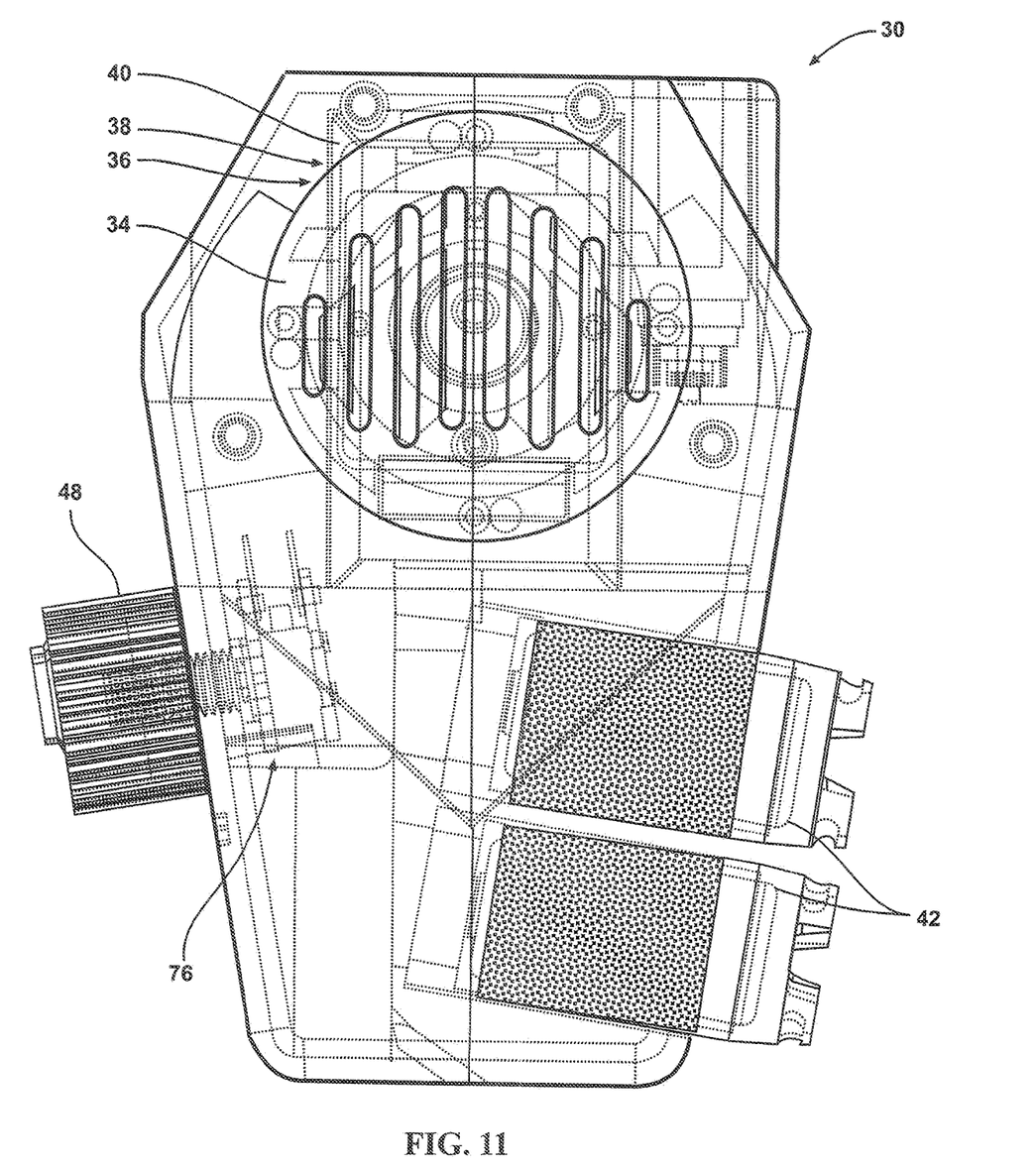
FIG. 11 is a front wire view of the voice communication relay device showing the location of the components of the device behind the front of the housing.

FIGS. 4-11 show that the voice communication relay device (or "the device") 30 comprises: a housing 32; a device speaker 34 associated with the housing (the device speaker along with the other internal components are shown in FIG. 11); an amplifier 36 in the housing; a microphone pre-amplifier 38 in the housing; a circuit board 40 located inside the housing; a power source 42; a first receptacle 44 in the housing for a first connector (FIG. 2); and a second receptacle 46 in the housing for a second connector. The first connector is for establishing a connection between the audio output of a headset 12 and the device speaker 34 so that a user's voice will be transmitted to the device speaker 34 of the voice communication relay device 30 without using any speaker on the protective mask 10. The second connector is for establishing a connection between the voice communication relay device 30 and a PTT device 14, which may in turn be connected to a user's radio 28 for communication with other radios. The housing 32 may further comprise at least one knob 48 for turning the device 30 on and off, and for controlling the volume. The voice communication relay device 30 is typically configured to be spaced away from the protective face mask 10, rather than being attached thereto.

FIG. 2 shows that the voice communication relay device 30 may, and typically does, comprise part of a voice communication relay system comprising the voice communication relay device 30 and a connection cable 50 having two ends, each end with two pins thereon. The ends of the cable 50 comprise a first end 50A and a second end 50B. The ends may be identical. One of the first and second ends, such as 50A, is inserted into a two pin female port 20 for a boom microphone of a headset 12, and the other end 50B is inserted into a two pin female port 24 for the speaker 16 of the protective mask 10 having an embedded microphone.

Figure 6:
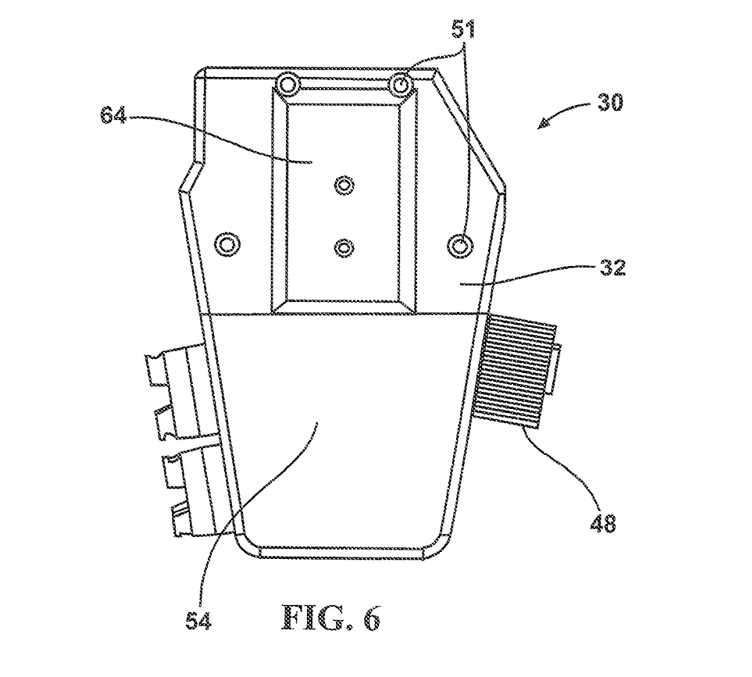
FIG. 6 is a rear view of the voice communication relay device.
Figure 7:
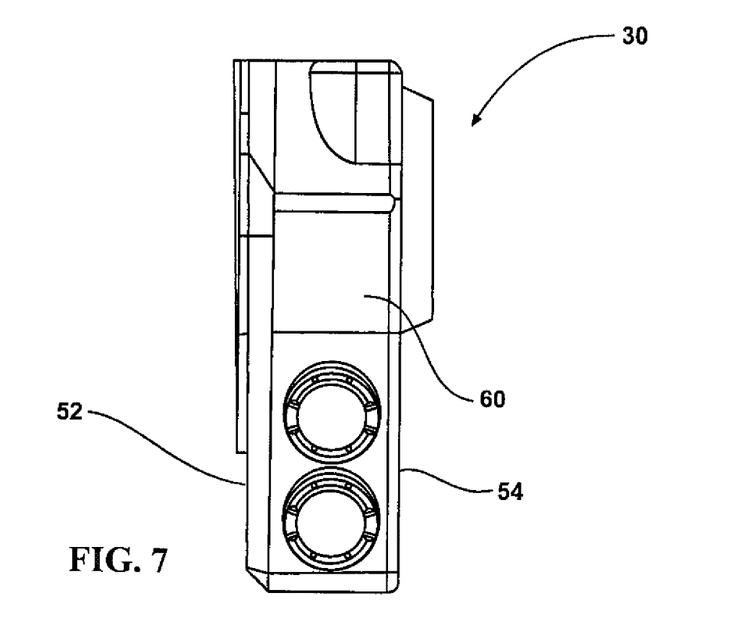
FIG. 7 is a right side view of the voice communication relay device.
Figure 8:
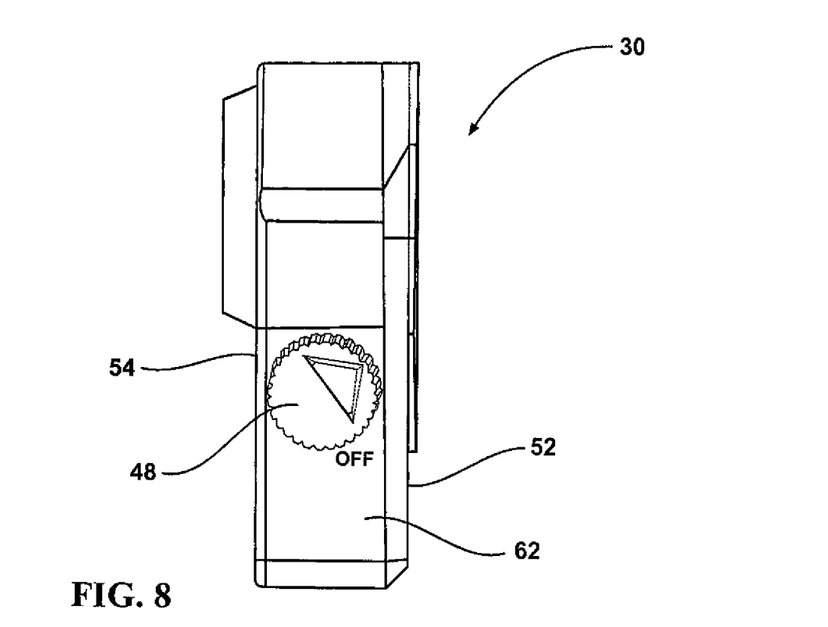
FIG. 8 is a left side view of the voice communication relay device.
Figure 9:
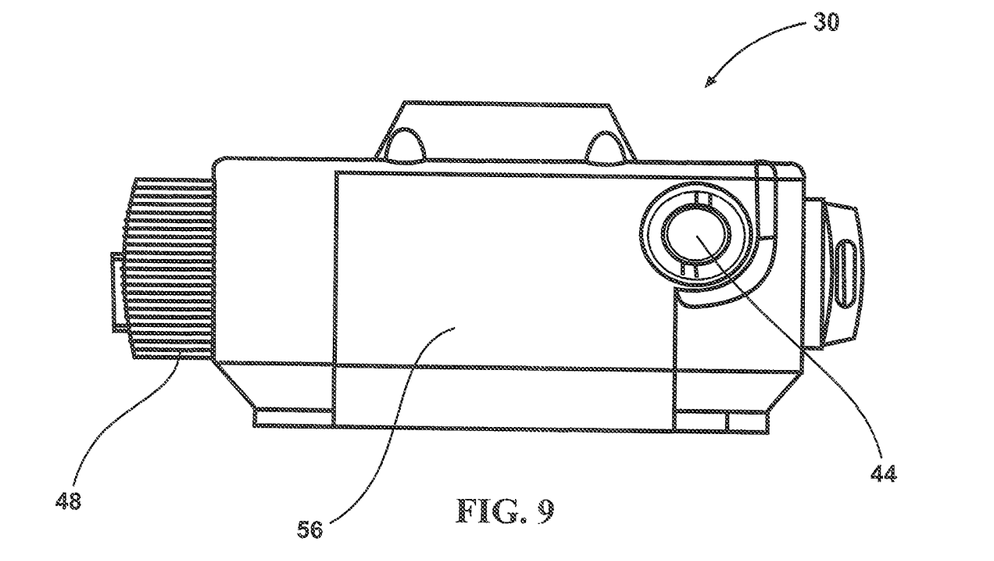
FIG. 9 is a top view of the voice communication relay device.
Figure 10:
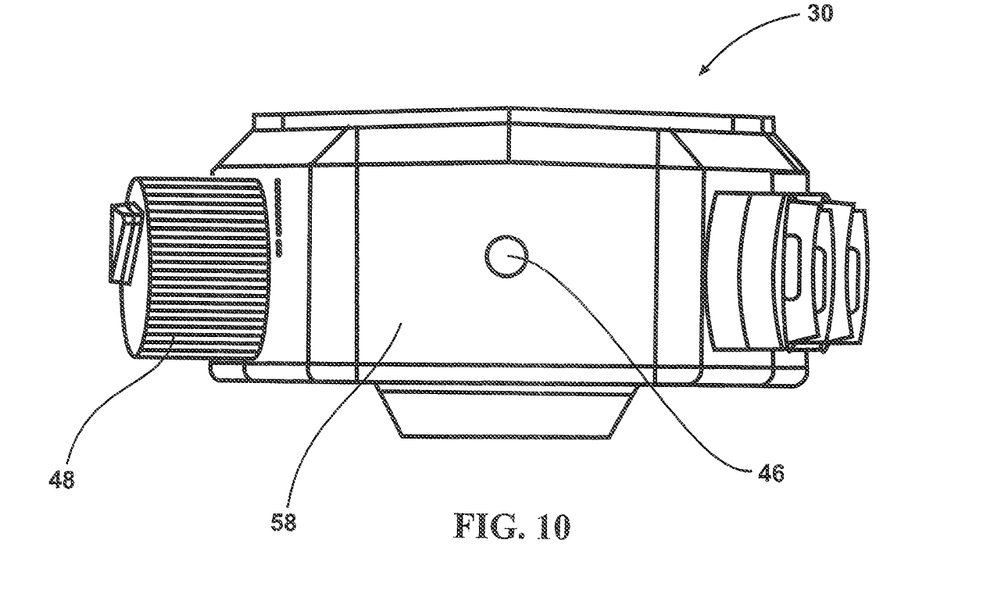
FIG. 10 is a bottom view of the voice communication relay device.

FIGS. 4-10 show that the housing 32 may be in the form of a custom designed shell which allows the device 30 to be held in one hand for ease of connection to the user's protective gear, or to the PTT device 14. The shell may comprise two or more portions that are joined together in any suitable manner. In some embodiments (as shown in FIG. 6), the portions of the housing may be provided with openings 51 for screws that join the portions of the housing together. The housing 32 has a front 52, a back 54, a top 56, a bottom 58, a right side 60, and a left side 62.

The housing 32 of the voice communication relay device 30 can be made of any suitable material(s) and by any suitable process. In one embodiment, the housing 32 is made using an additive manufacturing process which comprises a nylon base with a chopped carbon fiber inlay. A more ruggedized version can be made with an aluminum shell. Less tough and less expensive shells can be made from high-density polyethylene (HDPE). Factors influencing the choice of material(s) for the housing 32 include how long the user would want each system to last and specifications on how sealed the system should be from environmental factors such as gases, dirt, water, oils, etc.

The housing 32 may be associated with the user in any suitable manner. The term "associated with", as used herein with reference to the relationship between the components described herein and the user, means that the component in issue may be: carried by the user; joined to an article that the user is wearing; and/or within reach of the user. In one embodiment, the housing 32 may be configured to be connected to the MOdular Lightweight Load-carrying Equipment (MOLLE) straps of the user's vest by a gator clip joined to the back 54 of the housing 32. FIG. 6 shows the gator clip attachment location 64. This configuration allows for maximum stability of the housing 32 while being in line with user demands.

The device speaker 34 is used for locally broadcasting to those in the vicinity of the person with the voice communication relay device 30. The front 52 of the housing 32 shown in the drawings contains a plurality of openings 66 for output from the device speaker 34. The term "device speaker", as used herein, refers to the speaker 34 of the voice communication relay device 30, as distinguished from any speaker 16 provided with the mask 10. The device speaker 34, along with other internal components of the voice communication relay device 30, is shown in FIG. 11. The device speaker 34 can be any suitable type of speaker. In one embodiment, the device speaker 34 may be a 16 ohm, 2 watt nominal and 3 watt maximum speaker. The device speaker 34 is associated with the housing 32. The term "associated with", as used herein with reference to the device speaker 34 and the housing 32, means that the device speaker 34 can be located partially, or entirely inside the housing 32 (that is, at least part of the device speaker 34 is located inside the housing 32).

The amplifier 36 may be in any suitable location relative to the housing 32. FIG. 11 shows the amplifier 36 being located inside the housing 32. In the embodiment shown in FIG. 11, the amplifier 36 is located on the rectangular circuit board 40 sitting behind the device speaker 34. The amplifier 36 can be any suitable type of amplifier. In one embodiment, the amplifier 36 may be a push-pull audio amplifier. The amplifier 36 is electrically connected to the device speaker 34.

The term "electrically connected", as used herein includes direct and indirect connections. Indirect connections are those in which the components are connected together by one or more components located between the indirectly connected components. This applies to the relationship between the different components that comprise the voice communication relay device 30. The term "electrically connected" is similarly used with reference to the voice communication relay device and the user's other communication equipment herein. When the voice communication relay device and the user's other communication equipment are described as being "electrically connected", they may be connected by any means known in the art including wired and wireless connections.

The microphone pre-amplifier 38 may be in any suitable location relative to the housing 32. FIG. 11 shows the microphone pre-amplifier 38 is located inside the housing 32. In the embodiment shown in FIG. 11, the microphone pre-amplifier 38 is also located on the rectangular circuit board 40 sitting behind the device speaker 34. The microphone pre-amplifier 38 can be any suitable type of pre-amplifier. In one embodiment, the microphone pre-amplifier 38 may be an NPN transistor-based electret microphone pre-amplifier. The pre-amplifier 38 is electrically connected to the amplifier 36 and the device speaker 34.

Figure 12:
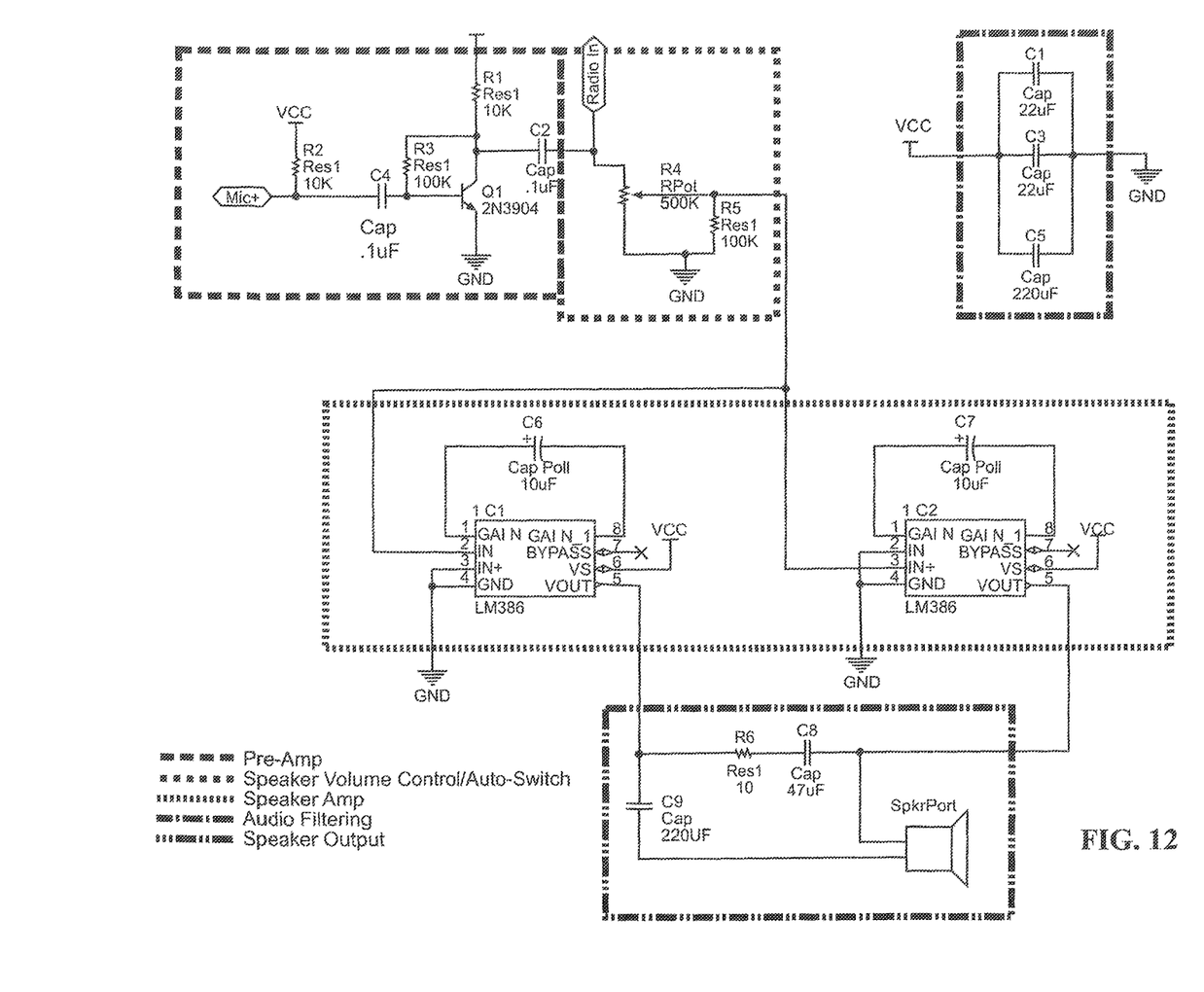
FIG. 12 is one embodiment of a circuit board layout for the device.
Figure 13:
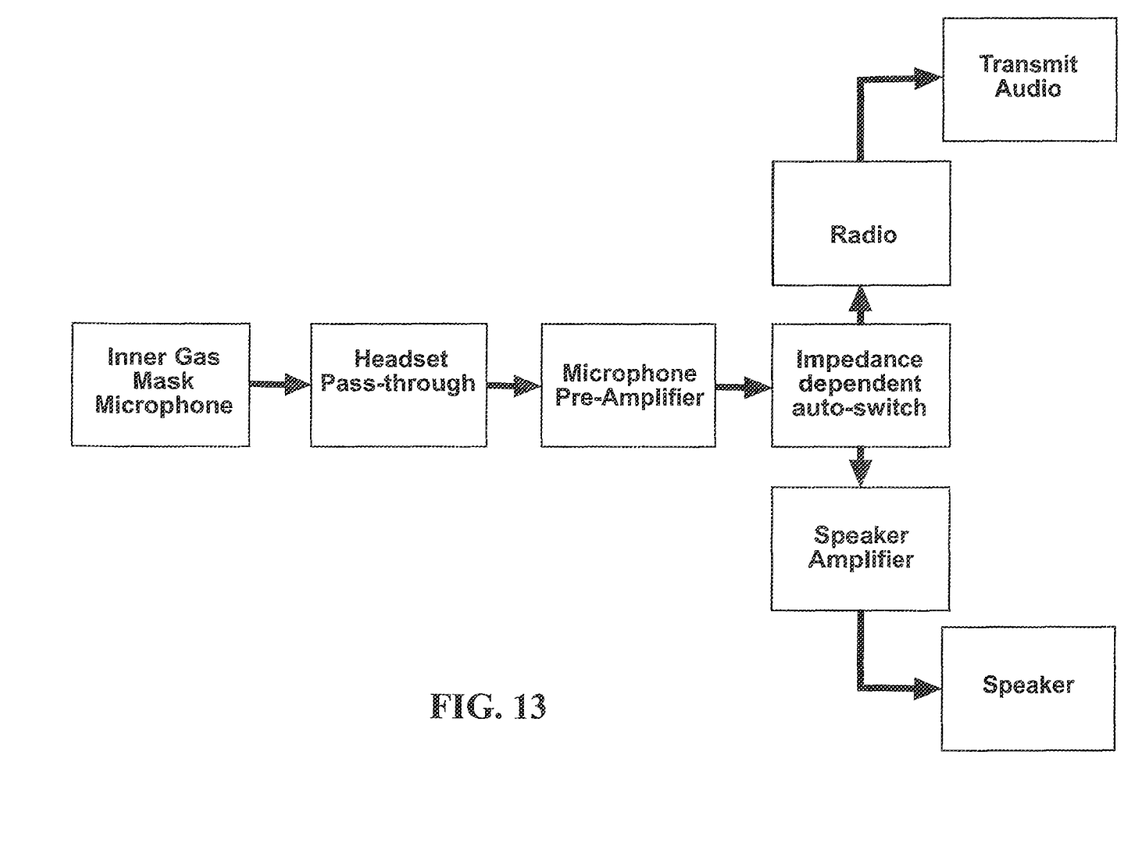
FIG. 13 is a block diagram of the operation of the system.

The circuit board 40 is located inside the housing 32. In the embodiment shown in FIG. 11, the circuit board 40 is located behind the device speaker 34. FIG. 12 is a diagram of one embodiment of the circuit board 40 that was developed for the device 30. The circuit board 40 is electrically connected to the first connector (or "input connector") 70 for establishing a connection between the audio output of the headset 12, as well as with the device speaker 34, and with the second connector 72 for establishing a connection between the voice communication relay device 30 and a PTT device 14. The power source 42 and volume knob 48 are also part of the analog audio circuit with the circuit board 40.

When in use, the circuit board 40 is electrically connected to: the embedded microphone of the protective mask 10 (as the input); the device speaker 34 (output option 1); and the user's radio 28 (output option 2). During use of the device 30, the circuit board 40 is indirectly electrically connected to the embedded microphone of the protective mask 10 through the connector 50 and then through the cord and male plug 22 of the headset 12. Similarly, the circuit board 40 is indirectly electrically connected to the radio 28 through the PTT device 14. At least one function of the circuit board 40 is to serve as an Impedance Dependent Auto Switch (IDAS) that is electrically connected to the device speaker 34 and the second connector for selectively sending signals to the device speaker 34 or to a radio 28 that is connected to the PTT device 14.

The impedance dependent auto switch (IDAS) functions by changing how the audio signal propagates through the system by changing its respective output and input based on the destination impedance. The audio signal is normally being passed to the amplifier 36 which has a very high input impedance. This audio can be thought of like water that is always being forced through a very tight pipe. When the PTT 14 is pushed, it forms a connection from the same audio line to the radio 28 input, however the radio's input impedance is much lower than the amplifier's. So this is like opening a third valve on that water pipe, but this third valve is much wider thus ensuring the vast majority of the water (audio signal) will flow through the wider opening (to the radio 28). When this happens, the audio signal by passes the output amplifier 36 and device speaker 34. The audio signal, however, typically does not bypass the pre-amplifier 38. The pre-amplifier 38 may be used regardless of output device (device speaker 34 or radio 28). Because the voice communication relay device 30 does not broadcast locally when the PTT is pushed, it reduces any communication interference between users in close proximity during radio transmissions, while also operating on the same frequency as those user's radios.

The power source 42 can comprise any suitable type of power source. In one embodiment, the power source can comprise two (2) CR123 high power lithium batteries. The power source 42 may comprise at least a portion that is located inside the housing 32. In the embodiment shown in the drawings, portions of the batteries are located inside the housing 32, and portions are located outside the housing. In one embodiment, two SUREFIRE® flashlight casings (or portions thereof) from Surefire, LLC, of Fountain Valley, CA may be used as battery covers to hold the batteries. The power source 42 is electrically connected to the device speaker 34, and the circuit board 40.

The first receptacle (for input) 44 in the housing 32 is for a first connector 70 for establishing a connection between the audio output of a headset 12 and the device speaker 34. The first receptacle 44 can be located on any surface of the housing 32 (top, bottom, front, back, or sides). In the embodiment shown, the first receptacle 44 is located in the top 56 of the housing 32. The first connector 70 can be any suitable type of connector. In one embodiment, the first connector 70 can be a female NEXUS® connector available from AMPHENOL® NEXUS® Technologies of Stamford, CT. The female NEXUS® connector 70 receives the male NEXUS® connector 22 at the end of the cord extending from the headset 12.

The second receptacle (for output) 46 in the housing 32 is for a second connector 72 for establishing a connection between the voice communication relay device 30 and a PTT device 14. The second receptacle 46 can be located on any surface of the housing (top, bottom, front, back, or sides). In the embodiment shown, the second receptacle 46 comprises an opening for a cable or cord 74 and is located in the bottom 58 of the housing 32. The second connector 72 can be any suitable type of connector. In one embodiment, the second connector 72 can be a male NEXUS® connector on the end of a cable 74 that connects to the PTT device's female NEXUS® connector. The voice communication device's 30 male NEXUS® cable 74 may be in the form of a pigtail cable (to give the operator better freedom of movement). The PTT device 14 may in turn be connected to a user's radio 28 for communication with other radios.

The knob 48 is provided for turning the device 30 on and off. In the embodiment shown, a single knob 48 is used for both turning the device 30 on and off, and for controlling the volume. Volume control is carried out by a potentiometer 76 (FIG. 11) that is electrical connected to the knob 48. It should be understood that this is only one possible embodiment, and in other embodiments, the location of the knob 48 and the locations of any of the other features as described herein as being on the top, bottom, left, and right sides of the housing 32 can be altered in any suitable manner.

As shown in FIGS. 2 and 3, the 2-pin connection cable 50 conveys audio from the internal microphone of the protective face mask 10 to the headset 12. From there, the audio is passed down the male NEXUS® from the headset 12, by using the 2-pin connection that the headset's boom microphone 18 typically uses, to the input receptacle 44 to the voice communication relay device 30.

The voice communication relay device 30 is part of a voice communication relay system designed to fix common communication clarity issues found in the field while using mission oriented protective posture (MOPP) equipment in a chemical, biological, radiological, nuclear (CBRN) environment. The voice communication relay device 30 allows the standard gas mask output speaker (including external speakers not part of the gas mask) to be bypassed, while connecting directly to a NEXUS® plug input and output. This allows for the creation of clear communication lines compared to the traditional method of using the PELTOR™ boom microphone 18 in front of the M50 gas mask speaker, which creates distortion and issues with voice clarity.

The voice communication relay device 30 may be used in any suitable manner, one example of which is as follows. The housing 32 of the voice communication relay device 30 may be secured to the MOLLE straps of a user's vest by using a gator clip attached to the back of the housing 32. Once done, as shown in FIG. 2, the male NEXUS® plug 22 from the user's PELTOR™ COMTAC™ headset 12 may be inserted into the female NEXUS® port 44 located on top 56 of the voice communication relay device 30.

The male NEXUS® connector 72 at the end of the cord 74 coming from the voice communication relay device 30 should then be connected to the user's PTT device 14. At this point, the boom microphone 18 located on the PELTOR™ COMTAC™ headset 12 should have its two pin connection removed from boom microphone female connection port 20 of the PELTOR™ COMTAC™ headset 12. It is safe to let the microphone cord dangle—but the cord should be secured if possible.

Next, the M50 mask speaker box 16 should be removed, if connected. At this point, one end of the supplied two pin connector 50 should be inserted into the two pin female port 24 on the front of the M50 mask, and the other end connected into the now empty PELTOR™ COMTAC™ headset 12 boom microphone female connection port 20.

The system can then be powered on with the dial 48 located on the voice communication relay device 30. The user may adjust the volume as needed, and turn the system completely off by turning the knob to the OFF setting until a "click" is heard.

The voice communication relay device 30 will output the user's voice from its speaker 34 when the system is turned ON without any other inputs. The volume of the user's voice is controlled by the volume knob 48.

If the user presses the PTT 14, voice communications will only flow from radio 28 to radio—nothing will come from the voice communication relay device speaker 34.

It should be understood that the above describes only one method of using the voice communication relay device 30, and that the steps described above may be performed in any suitable order. It should also be understood that although the above method describes the use of the voice communication relay device 30 in conjunction with an M50 mask and a PELTOR™ COMTAC™ headset, the voice communication relay device 30 can be used in conjunction with any suitable protective face mask and headset.

Various alternative embodiments of the voice communication relay device 30 and its uses are possible. The voice communication relay device 30 can be configured with a different housing to change the shape to better fit the needs of different customers. The configuration shown in the drawings provides a small size housing that can be easily held and used with a gloved hand.

The voice communication relay device 30 and the system described herein have a number of unique features. These include:

1. The voice communication relay device 30 broadcasts passively by turning the voice communication relay device 30 to ON. There is no PTT requirement to broadcast from the voice communication relay device speaker 34 to those in the vicinity of the user. The user's radio 28 can be turned to ON or OFF.

2. The voice communication relay device 30 has the ability to key the push-to-talk (PTT) device 14 when the voice communication relay device speaker 34 is set to ON, sending communications only from the user's radio 28 to other radios.

3. By using a volume knob 48 located on the voice communication relay device 30, the user can turn local external transmissions off completely and only send information from the user's radio 28 to others' radios via the PTT device 14.

The voice communication relay device 30 and the system described herein can provide a number of advantages. It should be understood, however, that these advantages need not be required unless they are set forth in the appended claims. The voice communication relay device 30 provides improved voice transmission quality for people wearing protective equipment. The voice communication relay device 30 alleviates hearing and speaking issues caused by attempting to communicate with others through the speaker on a protective face mask into the boom microphone of a headset that is worn outside the wearer's protective gear. Additional advantages are described throughout the Detailed Description.

The voice communication relay device 30 can be used in many situations. The voice communication relay device 30 can replace the existing M50 gas mask speaker 16 for all tactical air control party (TACP), joint terminal attack controller (JTAC), and pararescue (PJ) users. The voice communication relay device 30 can be used by sister services including the Army and for civilian uses. These uses can include, but are not limited to specialized police units and chemical and biological cleanup agencies. In addition, firefighters could use the system in most environments, if the system is made out of suitable materials. In short, any field in which communication is a key factor, but is limited due to a worn protective gear would be an appropriate market for the voice communication relay device 30.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A voice communication relay device for use in combination with:
   a protective face mask having an embedded microphone for a speaker; a headset having a connection for a boom microphone and an output cord having an end with a plug thereon; a radio; and a push-to-talk (PTT) device that is connectable to the radio, said voice communication relay device comprising:
   a housing having an input connector and an output connector associated therewith, wherein:
      said input connector is configured for connection with the plug on the output cord from said headset, wherein said input connector comprises a female connector located in a first receptacle in said housing, wherein said female connector is configured for accepting a single prong male connector on the output cord from said headset;
      said output connector is configured for connection with said PTT device that is to be connected to said radio;
   a device speaker associated with said housing;
   an amplifier in said housing, said amplifier being electrically connected to said device speaker;
   a microphone pre-amplifier in said housing, said pre-amplifier being electrically connected to said amplifier and said device speaker;
   a circuit board located inside said housing, said circuit board being electrically connected to: said input connector; said device speaker; and said output connector; and
   a power source being associated with said housing, said power source being electrically connected to said device speaker, and said circuit board,
   wherein at least one function of said circuit board is to serve as an Impedance dependent auto switch (IDAS) that is electrically connected to said device speaker and said output connector for selectively sending audio signals to said device speaker or to said PTT device that is to be connected to said radio.

2. The voice communication relay device of claim 1 wherein said output connector comprises a cable having an end with a single prong male plug thereon which is configured for plugging into said PTT device.

3. The voice communication relay device of claim 2 wherein:
   the input connector establishes a connection between the audio output of said headset and the device speaker so that a user's voice will be transmitted to the device speaker of the voice communication relay device without using any speaker on the protective face mask; and the output connector establishes a connection between the voice communication relay device and said PTT device, which is connected to said radio for communication with other radios.

4. A voice amplification system comprising:

the voice communication relay device of claim 1; and a two-way connection cable having two ends, each end with two pins thereon, said ends comprising a first end and a second end, wherein one of said first and second ends is configured to be inserted into a two pin female port of said headset for said boom microphone, and the other end being configured to be inserted into a two pin female port for said speaker of said protective face mask.

5. A protective equipment system with voice communication capability comprising:

(a) a protective face mask having an embedded microphone for an external speaker and a speaker port for a connection between the external speaker and the embedded microphone;

(b) a headset for wearing outside said protective face mask, said headset having a microphone port for connecting a boom microphone, and an output cord having an end with a plug thereon;

(c) a push-to-talk (PTT) device;

(d) a radio that is connected to said PTT device;

e) a cable having two ends, wherein one of said ends is inserted into the microphone port of the headset, and the other end is inserted into the speaker port for an external speaker of the protective face mask; and (f) a voice communication relay device comprising:

a housing having an input connector and an output connector associated therewith, wherein the plug on the output cord from the headset is plugged into said input connector, and the output connector is connected to the PTT device;

a device speaker associated with said housing;

an amplifier in said housing, said amplifier being electrically connected to said device speaker;

a microphone pre-amplifier in said housing, said pre-amplifier being electrically connected to said amplifier and said device speaker;

a circuit board located inside said housing, said circuit board being electrically connected to: said input connector; said device speaker; and said output connector; and a power source being associated with said housing, said power source being electrically connected to said device speaker, and said circuit board, wherein said circuit board serves as an Impedance dependent auto switch (IDAS) that is electrically connected to said device speaker and said output connector of said voice communication relay device for selectively sending audio signals to said device speaker or to said radio connected to said PTT device.

6. A method of improving the voice transmission quality by a user of the combination of a protective face mask having a front with an internal microphone and a port for an external speaker, and a headset which is worn over the protective face mask, the headset having a microphone port for connecting a boom microphone, the headset also having a cord with a communication plug extending therefrom, said method comprising:

providing a two-way connector cable between the port for the external speaker of the protective face mask and the microphone port of the headset, wherein the two-way connector cable is used so that audio input into the internal microphone of the protective face mask bypasses the external speaker of the protective face mask and is transmitted to the headset;

providing a voice communication relay device comprising: a device speaker; an input port into which the communication plug from the headset is inserted: an output connector for transmitting audio to another device: and a circuit board that serves as an Impedance dependent auto switch (IDAS) that is electrically connected to said device speaker and said output connector for selectively sending audio signals to said device speaker or to said another device;

receiving audio signals from said user's voice, wherein said signals are transmitted from the internal microphone of the protective face mask to the headset, and then to the voice communication relay device through the cord from the headset; and using the voice communication relay device to send the audio signals to either the device speaker or to said another device through the output connector.

7. The method of claim 6 wherein said another device comprises a push-to-talk (PTT) device having a button, and said method further comprises a step of plugging the outgoing connector of the voice communication relay device into the user's push-to-talk device so that the voice communication relay device is electrically connected to a user's radio, and said user's radio is configured to communicate with other radios.

8. The method of claim 7 wherein when the PTT device button is not pushed, the IDAS is set to broadcast the user's voice with the device speaker wherein the user's voice is picked up by the internal microphone of the protective face mask, bypasses any external speaker of the protective face mask, and is then locally broadcast by the device speaker.

9. The method of claim 8 wherein when said PTT device button is pushed, the user's communications are only sent to the user's radio through the PTT device, and are not locally broadcast to those in the area surrounding the user by the device speaker.

10. The method of claim 9 wherein the voice communication relay device further comprises a control for said device speaker, wherein said control is in the form of a knob that provides an on/off function as well as volume control for the speaker, wherein when said control is in the off position, communications can still flow to the user's radio through the PTT device when the PTT button is pushed.

* * * * *